US011012874B1

(12) United States Patent
Ananth et al.

(10) Patent No.: US 11,012,874 B1
(45) Date of Patent: May 18, 2021

(54) METHOD AND APPARATUS FOR DETECTING AND RESPONDING TO A DISRUPTION IN COMMUNICATION SERVICES

(71) Applicant: Loon LLC, Mountain View, CA (US)

(72) Inventors: Sharath Ananth, Cupertino, CA (US); Erik Stauffer, Cupertino, CA (US); Jibing Wang, Cupertino, CA (US)

(73) Assignee: Loon LLC, Mountain View, CA (US)

( * ) Notice: Subject to any disclaimer, the term of this patent is extended or adjusted under 35 U.S.C. 154(b) by 0 days.

(21) Appl. No.: 16/837,646

(22) Filed: Apr. 1, 2020

(51) Int. Cl.
| | |
|---|---|
| *H04W 84/06* | (2009.01) |
| *H04W 24/04* | (2009.01) |
| *H04B 7/185* | (2006.01) |
| *H04W 40/22* | (2009.01) |
| *H04W 24/08* | (2009.01) |
| H04W 88/08 | (2009.01) |

(52) U.S. Cl.
CPC ........ *H04W 24/04* (2013.01); *H04B 7/18504* (2013.01); *H04W 24/08* (2013.01); *H04W 40/22* (2013.01); *H04W 88/085* (2013.01)

(58) Field of Classification Search
CPC ..... H04W 36/00; H04W 60/04; H04W 84/06; H04W 84/047; H04W 36/0055
See application file for complete search history.

(56) References Cited

U.S. PATENT DOCUMENTS

| | | | |
|---|---|---|---|
| 9,836,063 B1* | 12/2017 | Bonawitz | ................. B64B 1/44 |
| 2018/0279133 A1* | 9/2018 | Gayrard | ............ H04B 7/18504 |
| 2019/0200204 A1 | 6/2019 | Gross et al. | |
| 2019/0239058 A1 | 8/2019 | Gross et al. | |
| 2020/0044732 A1 | 2/2020 | Cui et al. | |
| 2020/0045610 A1 | 2/2020 | Shih et al. | |
| 2020/0266880 A1* | 8/2020 | Gayrard | ............ H04B 7/18504 |

OTHER PUBLICATIONS

3GPP, 3rd Generation Partnership Project; Technical Specification Group Radio Access Network; Study on Integrated Access and Backhaul; (Release 15), 2018, pp. 1-8.

* cited by examiner

*Primary Examiner* — Tu X Nguyen
(74) *Attorney, Agent, or Firm* — Botos Churchill IP Law (57) ABSTRACT

A high-altitude platform (HAP) node provides communication service during an emergency. The HAP node uses a first network to provide communication services for handling calls initiated by at least one user equipment (UE). The HAP node detects that an emergency disruption has occurred that prevents the use of the first network. In response to detecting the occurrence of the emergency disruption, a mobile terminal (MT) in the HAP node searches for a second network able to accept emergency calls. The HAP node determines whether the second network will handle all calls initiated by the at least one UE or only emergency calls generated by the at least one UE. The HAP node handles the calls based on the determining and through the use of the second network.

20 Claims, 9 Drawing Sheets

METHOD AND APPARATUS FOR DETECTING AND RESPONDING TO A DISRUPTION IN COMMUNICATION SERVICES

BACKGROUND

Telecommunications connectivity via the Internet, cellular data networks and other systems is available in many parts of the world. However, there are many locations where such connectivity is unavailable, unreliable or subject to outages from natural disasters. Some systems are able to provide network access to remote locations or to locations with limited networking infrastructure via satellites or other high-altitude platforms (HAPs) that are located in the stratosphere. HAPs may communicate with each other and with ground-based networking equipment and mobile devices to provide telecommunications connectivity, for instance according to the Long-Term Evolution (LTE) standard.

BRIEF SUMMARY

Aspects of the technology provide a HAP as a mobile integrated access and backhaul (IAB) node. A next generation Node B (gNB) on the HAP includes a selectively-activatable embedded mobile terminal (MT) (e.g., a user equipment (UE) transceiver). Normally, the HAP provides a user of a UE with communication services, whereby the HAP obtains backhaul service from a first network that currently covers a first region. However, in the case of an emergency situation, such as when a hurricane or a tornado impacts the first region, the user's UE may lose service provided by the first network and the HAP may lose the backhaul service from the first network. An emergency is determined to have occurred in this type of situation. The selectively-activatable embedded MT of the HAP is then activated and attempts to obtain a different backhaul service from a second network. If the second network belongs to the same network provider as the first network, there is no special procedure required. IAB protocols already allow for the IAB node to get backhaul from a different network, as long it belongs to the same network provider.

However, when the second network belongs to a different network provider than the network provider the first network belongs to, an enhanced IAB procedure may be implemented, whereby the selectively-activatable embedded MT communicates with the second network, which resides outside of the region previously handled by the first network. Thus, emergency IAB requests can be accepted, and a new backhaul for the HAP is established so that it may continue to provide at least emergency services to the user.

In one aspect of the technology, communication service is provided during an emergency. A HAP node provides communication services for handling calls initiated by at least one UE using a first network. The HAP node detects that an emergency disruption has occurred that prevents the use of the first network. In response to detecting the occurrence of the emergency disruption, a MT in the HAP node searches for a second network able to accept emergency calls. The HAP node determines whether the second network will handle all calls initiated by the at least one UE or only emergency calls generated by the at least one UE. The HAP node may handle the calls based on the determining and through the use of the second network.

The HAP node may activate the MT to initiate the searching for the second network when the HAP node detects that the emergency disruption has occurred. The second network may include a terrestrial-IAB node that broadcasts a signal indicating whether the terrestrial-IAB node can handle only emergency calls or all calls. The MT may receive the signal broadcasted by the terrestrial-IAB node. Information related to establishing a connection with the terrestrial-IAB node may be stored based on the signal. At least one link between the HAP node and the second network may be established. The at least one link may include an IAB link. The emergency disruption may be detected by the HAP node receiving a message from a satellite.

In one aspect of the technology, a HAP node may include a distribution unit (DU) configured to receive a call from at least one UE and a mobile terminal (MT). The HAP node may provide communication services for handling calls initiated by the at least one UE using a first network, detect that an emergency disruption has occurred that prevents the use of the first network. In response to detecting the occurrence of the emergency disruption, the MT may search for a second network able to accept emergency calls, determine whether the second network will handle all calls initiated by the at least one UE or only emergency calls generated by the at least one UE, and handle the calls based on the determining and through the use of the second network.

In one example, the HAP node activates the MT to initiate the searching for the second network when the HAP node detects that the emergency disruption has occurred. In another example, the second network includes a terrestrial-IAB node that broadcasts a signal indicating whether the terrestrial-IAB node can handle only emergency calls or all calls. In this example, the MT may optionally receive the signal broadcasted by the terrestrial-IAB node and store information related to establishing a connection with the terrestrial-IAB node based on the signal. In yet another example, the HAP node establishes at least one link between the HAP node and the second network. In this example, the at least one link optionally includes an IAB link. In a further example, the emergency disruption is detected by the HAP node receiving a message from a satellite.

In one aspect of the technology, a non-transitory computer readable medium may store instructions that, when executed by one or more processors in a HAP node, may cause the one or more processors to perform a method for providing communication service during an emergency.

The method may include providing communication services for handling calls initiated by at least one user equipment (UE) using a first network, and detecting that an emergency disruption has occurred that prevents the use of the first network. In response to detecting the occurrence of the emergency disruption, a second network able to accept emergency calls is searched for to replace the first network, and it is determined whether the second network will handle all calls initiated by the at least one UE or only emergency calls generated by the at least one UE. The calls are handled based on the determining and through the use of the second network.

In one example, the one or more processors in the HAP node activates a MT in the HAP node to initiate the searching for the second network when the HAP node detects that the emergency disruption has occurred. In another example, the second network includes a terrestrial-IAB node that broadcasts a signal indicating whether the terrestrial-IAB node can handle only emergency calls or all calls. In this example, the one or more processors of the HAP node optionally receives the signal broadcasted by the terrestrial-IAB node and stores information related to establishing a connection with the terrestrial-IAB node based on the signal.

In yet another example, the one or more processors of the HAP node establishes at least one link between the HAP node and the second network, wherein the at least one link includes an IAB link. In this example, the emergency disruption is optionally detected by the HAP node receiving a message from a satellite.

DETAILED DESCRIPTION

Overview

Figure 1:
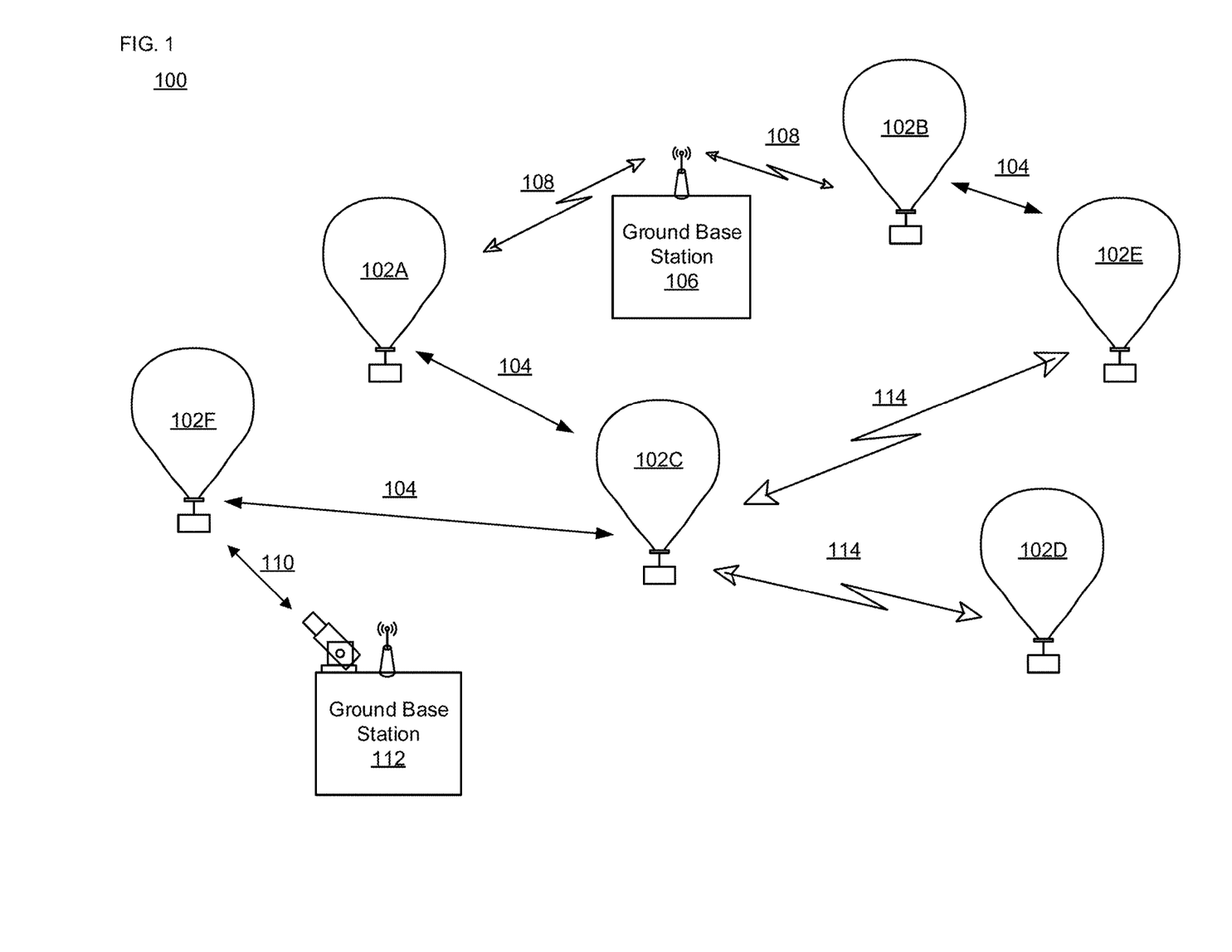
FIG. 1 depicts an example network in which a fleet of balloons or other HAPs may be used.

FIG. 1 depicts an example network 100 in which a fleet of balloons or other HAPs described above may be used. This example should not be considered as limiting the scope of the disclosure or usefulness of the features described herein. The network 100 may be considered a balloon network. In this example, the network 100 includes a plurality of devices, such as balloons 102A-F as well as ground base stations 106 and 112. The network 100 may also include a plurality of additional devices, such as various devices supporting a telecommunication service (not shown) as discussed in more detail below or other systems that may participate in the network.

The devices in the network 100 are configured to communicate with one another. As an example, the balloons may include communication links 104 and/or 114 in order to facilitate intra-balloon communications. By way of example, links 114 may employ radio frequency (RF) signals (e.g., millimeter wave transmissions) while links 104 employ free-space optical transmission. Alternatively, all links may be RF, optical, or a hybrid that employs both RF and optical transmission. In this way balloons 102A-F may collectively function as a mesh network for data communications. At least some of the balloons may be configured for communications with ground-based stations 106 and 112 via respective links 108 and 110, which may be RF and/or optical links.

In one scenario, a given balloon 102 may be configured to transmit an optical signal via an optical link 104. Here, the given balloon 102 may use one or more high-power light-emitting diodes (LEDs) to transmit an optical signal. Alternatively, some or all of the balloons 102 may include laser systems for free-space optical communications over the optical links 104. Other types of free-space communication are possible. Further, in order to receive an optical signal from another balloon via an optical link 104, the balloon may include one or more optical receivers.

The balloons may also utilize one or more of various RF air-interface protocols for communication with ground-based stations via respective communication links. For instance, some or all of balloons 102A-F may be configured to communicate with ground-based stations 106 and 112 via RF links 108 using various protocols described in IEEE 802.11 (including any of the IEEE 802.11 revisions), cellular protocols such as GSM, CDMA, UMTS, EV-DO, WiMAX, and/or LTE, 5G and/or one or more proprietary protocols developed for long distance communication, among other possibilities. In one example using LTE communication, the ground base stations 106 and 112 may be Evolved Node B (eNodeB) base stations. In another example using 5G new radio (NR) communication, the ground base stations 106 and 112 may be gNB base stations. In another example, they may be base transceiver station (BTS) base stations. These examples are not limiting.

Figure 2:
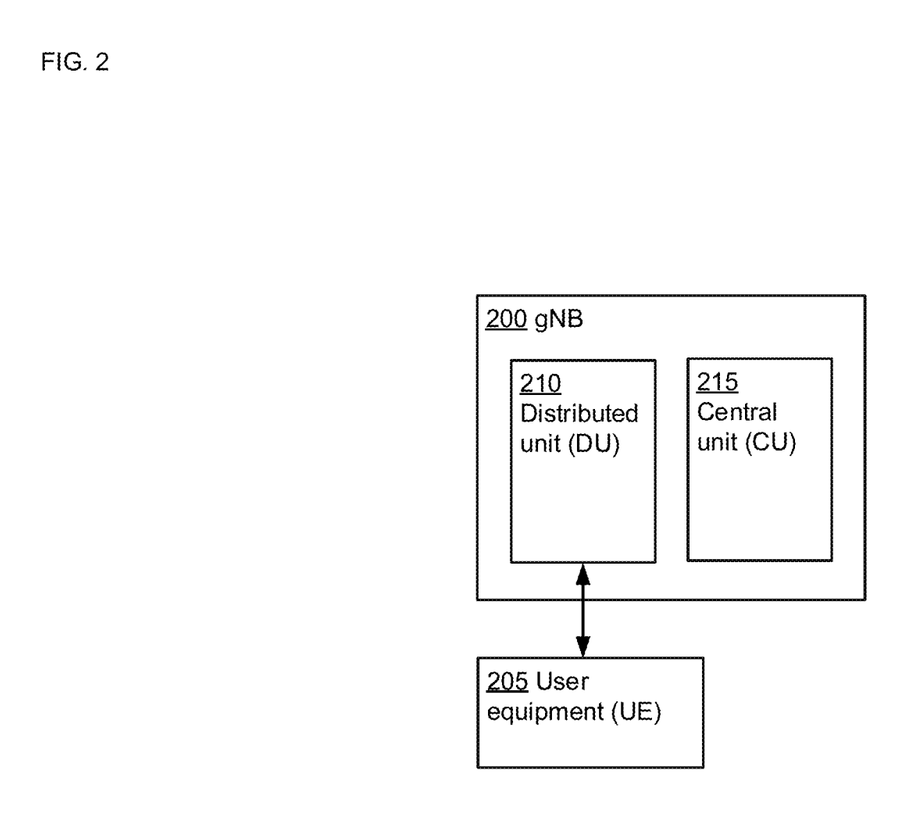
FIG. 2 is a functional diagram of a gNB in accordance with aspects of the technology.

For receiving and processing these communications from a HAP or UE, the ground base stations 106 and 112 may have a split architecture. For example, as shown in FIG. 2, when performing as a gNB 200, as described in further detail below, the architecture of a ground base station may include a distributed unit (DU) 210 and a central unit (CU) 215. The DU 210 may be configured to communicate with a HAP, such as a balloon, or a UE, such as UE 205. The CU 215 may be configured to perform functions not otherwise assigned to the DU 210. For example, the CU 215 may perform route or resource management and may control the DU 210 accordingly. Other distributions of functions between the DU 210 and the CU 215 are possible.

Returning to FIG. 1, in some examples, a greater link capacity for HAP-to-ground communications may be achieved using balloons. Increased capacity may be desirable to provide backhaul links from a ground-based gateway. Accordingly, an example network may also include balloons, which could provide a high-capacity air-ground link between the various balloons of the network and the ground base stations. For example, in the network 100, balloon 102F may be configured to directly communicate with the base station 112.

Like other balloons in the network 100, balloon 102F may be operable for communication (e.g., RF or optical) with one or more other balloons via link(s) 104. Balloon 102F may also be configured for free-space optical communication with ground-based station 112 via an optical link 110. Optical link 110 may therefore serve as a high-capacity link (as compared to an RF link 108) between the network 100 and the ground-based station 112. Balloon 102F may additionally be operable for RF communication with ground-based stations 106. In other cases, balloon 102F may only use an optical link for balloon-to-ground communications.

The balloon 102F may be equipped with a specialized, high bandwidth RF communication system for balloon-to-ground communications, instead of, or in addition to, a free-space optical communication system. The high bandwidth RF communication system may take the form of an ultra-wideband system, which may provide an RF link with substantially the same capacity as one of the optical links 104.

In a further example, some or all of balloons 102A-F could be configured to establish a communication link with space-based satellites and/or other types of HAPs (e.g., drones, airplanes, airships, etc.) in addition to, or as an alternative to, a ground-based communication link. In some embodiments, a balloon may communicate with a satellite or a HAP via an optical or RF link. However, other types of communication arrangements are possible.

As noted above, the balloons 102A-F may collectively function as a mesh network. More specifically, since balloons 102A-F may communicate with one another using free-space optical links or RF links, the balloons may collectively function as a free-space optical or RF mesh network. In a mesh-network configuration, each balloon may function as a node of the mesh network, which is operable to receive data directed to it and to route data to other balloons. As such, data may be routed from a source balloon to a destination balloon by determining an appropriate sequence of links between the source balloon and the destination balloon.

The network topology may change as the balloons move relative to one another and/or relative to the ground. Accordingly, the network 100 may apply a mesh protocol to update the state of the network as the topology of the network changes. The network 100 may also implement station-keeping functions using winds and altitude control or lateral propulsion to help provide a desired network topology. For example, station-keeping may involve some or all of balloons 102A-F maintaining and/or moving into a certain position relative to one or more other balloons in the network (and possibly in a certain position relative to a ground-based station or service area). As part of this process, each balloon may implement station-keeping functions to determine its desired positioning within the desired topology, and if necessary, to determine how to move to and/or maintain the desired position. For instance, the balloons may move in response to riding a wind current, or may move in a circular or other pattern as they station keep over a region of interest.

The desired topology may vary depending upon the particular implementation and whether or not the balloons are continuously moving. In some cases, balloons may implement station-keeping to provide a substantially uniform topology where the balloons function to position themselves at substantially the same distance (or within a certain range of distances) from adjacent balloons in the network 100. Alternatively, the network 100 may have a non-uniform topology where balloons are distributed more or less densely in certain areas, for various reasons. As an example, to help meet the higher bandwidth demands, balloons may be clustered more densely over areas with greater demand (such as urban areas) and less densely over areas with lesser demand (such as over large bodies of water). In addition, the topology of an example balloon network may be adaptable allowing balloons to adjust their respective positioning in accordance with a change in the desired topology of the network.

Example High-Altitude Platforms

The balloons of the network 100 shown in FIG. 1 may be high-altitude balloons (or other platforms) that are deployed in the stratosphere. As an example, in a high-altitude balloon network, the balloons may generally be configured to operate at stratospheric altitudes, e.g., between 50,000 ft and 70,000 ft or more or less, in order to limit the balloons' exposure to high winds and interference with commercial airplane flights. In order for the balloons to provide a reliable mesh network in the stratosphere, where winds may affect the locations of the various balloons in an asymmetrical manner, the balloons may be configured to move latitudinally and/or longitudinally relative to one another by adjusting their respective altitudes, such that the wind carries the respective balloons to the respectively desired locations. Lateral propulsion may also be employed to affect the balloon's path of travel.

Figure 3:
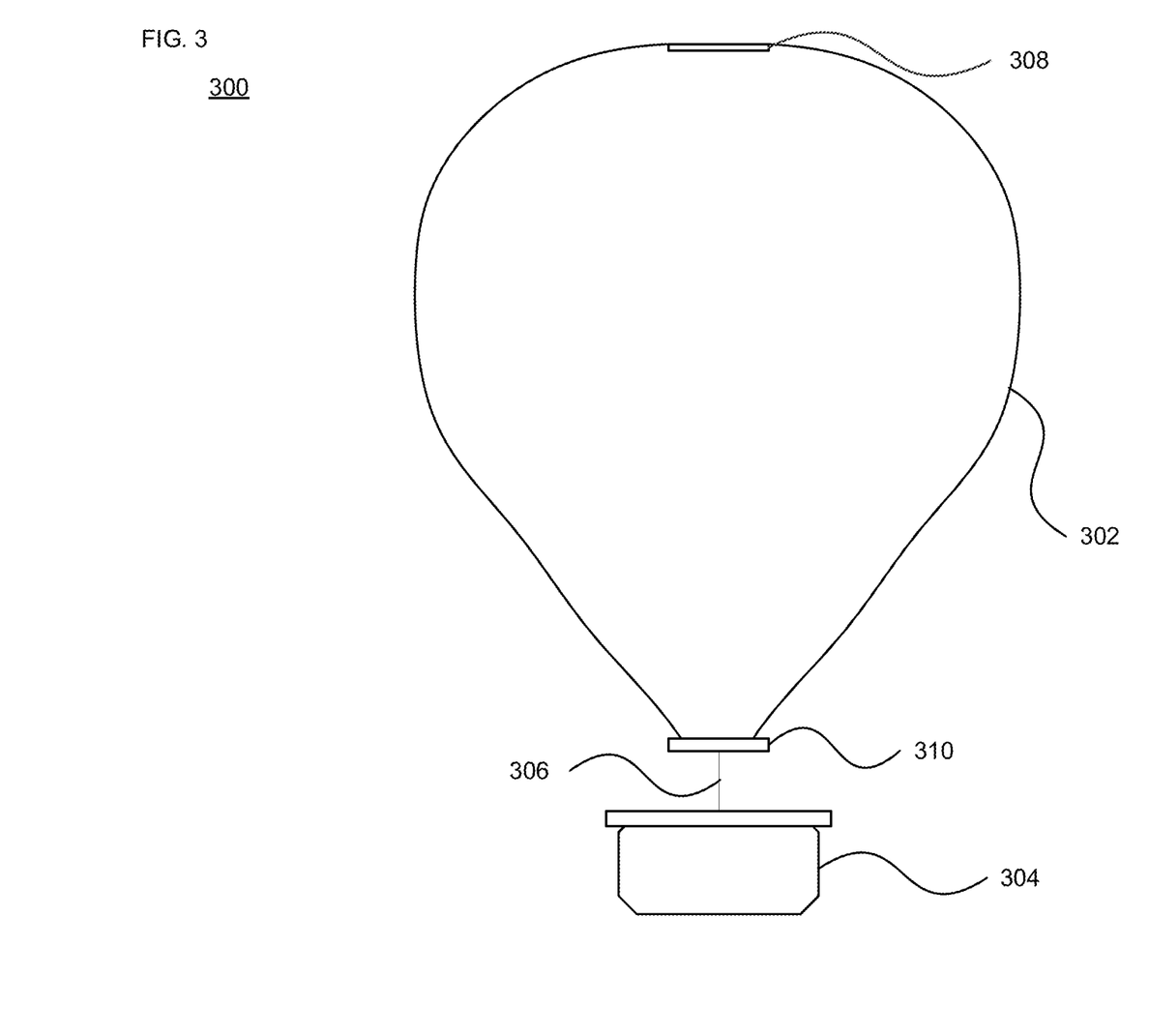
FIG. 3 illustrates a balloon configuration in accordance with aspects of the technology.

In an example configuration, the high-altitude balloon platforms include an envelope and a payload, along with various other components. FIG. 3 is one example of a high-altitude balloon 300, which may represent any of the balloons of FIG. 1. As shown, the example balloon 300 includes an envelope 302, a payload 304 and a coupling member (e.g., a down connect) 306 therebetween. At least one gore panel forms the envelope, which is configured to maintain pressurized lifting gas therein. For instance, the balloon may be a superpressure balloon. A top plate 208 may be disposed along an upper section of the envelope, while a base plate 310 may be disposed along a lower section of the envelope opposite the top place. In this example, the coupling member 306 connects the payload 304 with the base plate 310.

The envelope 302 may take various shapes and forms. For instance, the envelope 302 may be made of materials such as polyethylene, mylar, FEP, rubber, latex or other thin film materials or composite laminates of those materials with fiber reinforcements embedded inside or outside. Other materials or combinations thereof or laminations may also be employed to deliver required strength, gas barrier, RF and thermal properties. Furthermore, the shape and size of the envelope 302 may vary depending upon the particular implementation. Additionally, the envelope 302 may be filled with different types of gases, such as air, helium and/or hydrogen. Other types of gases, and combinations thereof, are possible as well. Shapes may include typical balloon shapes like spheres and "pumpkins", or aerodynamic shapes that are symmetric, provide shaped lift, or are changeable in shape. Lift may come from lift gasses (e.g., helium, hydrogen), electrostatic charging of conductive surfaces, aerodynamic lift (wing shapes), air moving devices (propellers, flapping wings, electrostatic propulsion, etc.) or any hybrid combination of lifting techniques.

Figure 4:
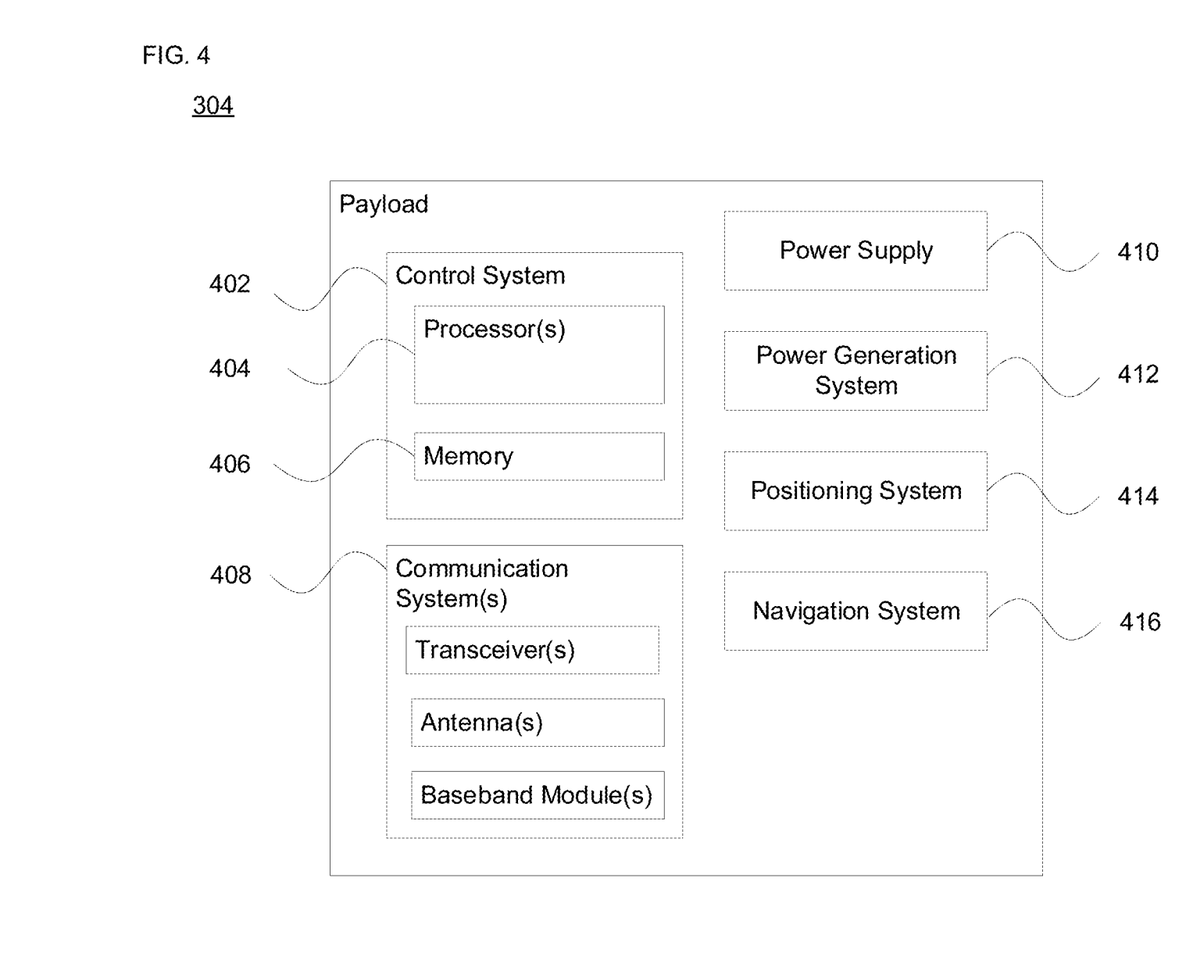
FIG. 4 is an example payload arrangement in accordance with aspects of the technology.

According to one example shown in FIG. 4, a payload 304 of a HAP includes a control system 402 having one or more processors 404 and on-board data storage in the form of memory 406. Memory 406 stores information accessible by the processor(s) 404, including instructions that can be executed by the processors. The memory 406 also includes data that can be retrieved, manipulated or stored by the processor. The memory can be of any non-transitory type capable of storing information accessible by the processor, such as a hard-drive, memory card (e.g., thumb drive or SD card), ROM, RAM, and other types of write-capable, and read-only memories. The instructions can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. The data can be retrieved, stored or modified by the one or more processors 404 in accordance with the instructions.

The one or more processors 404 can include any conventional processors, such as a commercially available CPU. Alternatively, each processor can be a dedicated component such as an ASIC, controller, or other hardware-based processor. Although FIG. 4 functionally illustrates the processor(s) 404, memory 406, and other elements of control system 402 as being within the same block, the system can actually comprise multiple processors, computers, computing devices, and/or memories that may or may not be stored within the same physical housing. For example, the memory can be a hard drive or other storage media located in a housing different from that of control system 402. Accordingly, references to a processor, computer, computing device, or memory will be understood to include references to a collection of processors, computers, computing devices, or memories that may or may not operate in parallel.

The payload 304 may also include various other types of equipment and systems to provide a number of different functions. For example, as shown in FIG. 4, the payload 304 includes one or more communication systems 408, which may transmit signals via RF and/or optical links as discussed above. By way of example only, the communication system 408 may provide LTE or other telecommunications services. The communication system(s) 408 include communication components such as one or more transmitters and receivers (or transceivers), one or more antennas, and one or more baseband modules.

Figure 5:
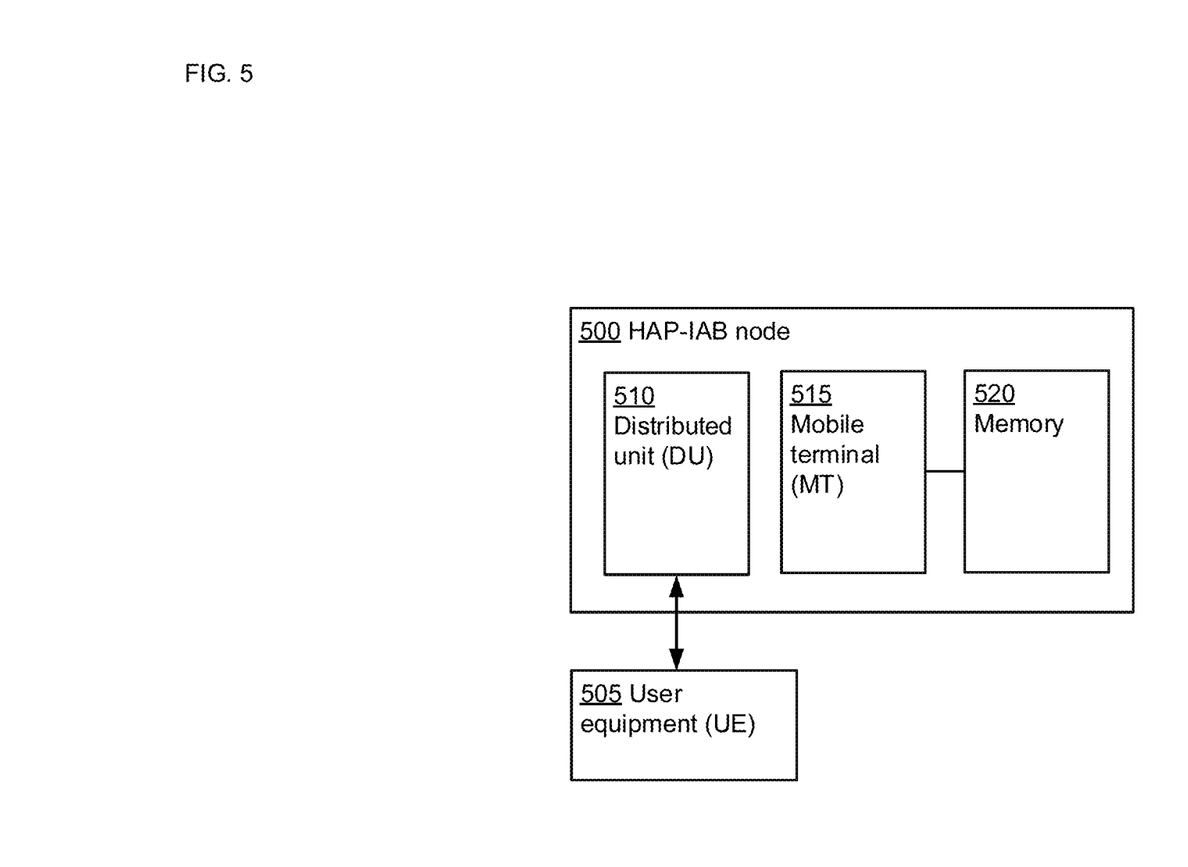
FIG. 5 is a functional diagram of a HAP-IAB node in accordance with aspects of the technology.

As shown in FIG. 5 and discussed in further detail below, the HAP carrying the payload 304 may perform as a HAP-IAB node 500. The payload 304 of the HAP may have a split protocol architecture. For example, the payload 304 may be configured to include a DU 510, a mobile terminal (MT) 515 and a memory 520. The memory 520 may reside outside of or inside the MT 515. The DU 510 may be configured to communicate with UE, such as UE 505. The MT 515 may include at least one UE transceiver and may be configured to communicate with another node in a network. In particular, the MT 515 of the HAP-IAB node 500 is responsible for mimicking UE behavior. The MT 515 may be selectively activated in particular situations, some of which are described further below. The MT 515 may include discrete hardware, a software module or a combination thereof used to emulate an MT. In some implementations, the MT 515 may be part of DU 510 or alternatively part of a second DU in the HAP-IAB node 500. The HAP-IAB node 500 may additionally have a CU that functions similar to CU 215 described above.

Returning to FIG. 4, the payload 304 is illustrated as also including a power supply 410 to supply power to the various components of the balloon. The power supply 410 could include one or more rechargeable batteries or other energy storage systems like capacitors or regenerative fuel cells. In addition, the payload 304 may include a power generation system 412 in addition to or as part of the power supply. The power generation system 412 may include solar panels, stored energy (hot air), relative wind power generation, or differential atmospheric charging (not shown), or any combination thereof, and could be used to generate power that charges and/or is distributed by the power supply 410.

As shown in FIG. 4, the payload 304 may additionally include a positioning system 414. The positioning system 414 could include, for example, a global positioning system (GPS), an inertial navigation system, and/or a star-tracking system. The positioning system 414 may additionally or alternatively include various motion sensors (e.g., accelerometers, magnetometers, gyroscopes, and/or compasses).

As shown in FIG. 4, the payload 304 may further include a navigation system 416 separate from, or partially or fully incorporated into control system 402. The navigation system 416 may implement station-keeping functions to maintain position within and/or move to a position in accordance with a desired topology or other service requirement. In particular, the navigation system 416 may use wind data (e.g., from onboard and/or remote sensors) to determine altitudinal and/or lateral positional adjustments that result in the wind carrying the balloon in a desired direction and/or to a desired location. Lateral positional adjustments may also be handled directly by a lateral positioning system that is separate from the payload. Alternatively, the altitudinal and/or lateral adjustments may be computed by a central control location and transmitted by a ground based, air based, or satellite-based system and communicated to the high-altitude balloon. In other embodiments, specific balloons may be configured to compute altitudinal and/or lateral adjustments for other balloons and transmit the adjustment commands to those other balloons.

The navigation system 416 is able to evaluate data obtained from onboard navigation sensors, such as an inertial measurement unit (IMU) and/or differential GPS, received data (e.g., weather information), and/or other sensors such as health and performance sensors (e.g., a force torque sensor) to manage operation of the balloon's systems. When decisions are made to activate the lateral propulsion system, for instance to station keep, the navigation system 416 then leverages received sensor data for position, wind direction, altitude and power availability to properly point the propeller and to provide a specific thrust condition for a specific duration or until a specific condition is reached (e.g., a specific velocity or position is reached, while monitoring and reporting overall system health, temperature, vibration, and other performance parameters).

Figure 6:
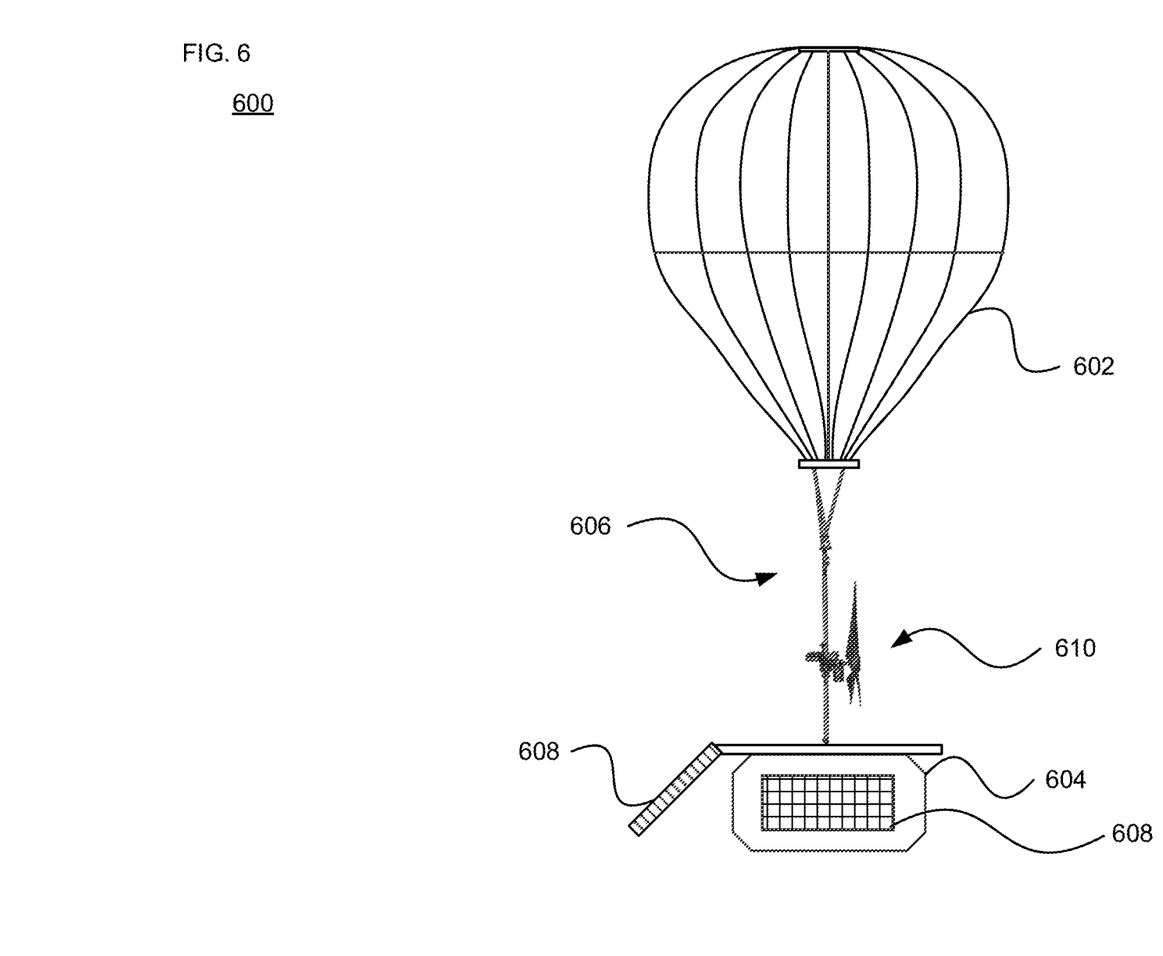
FIG. 6 illustrates one example configuration of a balloon platform with propeller-based lateral propulsion

In order to change lateral positions or velocities, the platform may include a lateral propulsion system. FIG. 6 illustrates one example configuration 600 of a balloon platform with propeller-based lateral propulsion, which may represent any of the balloons of FIG. 1. As shown in FIG. 6, the example configuration 600 includes an envelope 602, a payload 604 and a down connect member 606 disposed between the envelope 602 and the payload 604. Cables or other wiring between the payload 604 and the envelope 602 may be run within the down connect member 606. One or more solar panel assemblies 608 may be coupled to the payload 604 or another part of the balloon platform. The payload 604 and the solar panel assemblies 608 may be configured to rotate about the down connect member 606 (e.g., up to 360° rotation), for instance to align the solar panel assemblies 608 with the sun to maximize power generation. Example 600 also illustrates a lateral propulsion system 610. While this example of the lateral propulsion system 610 is one possibility, the location could also be fore and/or aft of the payload section 604, or fore and/or aft of the envelope section 602, or any other location that provides the desired thrust vector.

Other than balloons, drones may fly routes in an autonomous manner, carry cameras for aerial photography, and transport goods from one place to another. The terms "unmanned aerial vehicle (UAV)" and "flying robot" are often used as synonyms for a drone. The spectrum of applications is broad, including aerial monitoring of industrial plants and agriculture fields as well as support for first time responders in case of disasters. For some applications, it is beneficial if a team of drones rather than a single drone is employed. Multiple drones can cover a given area faster or take photos from different perspectives at the same time.

Example Methods

Figure 7A:
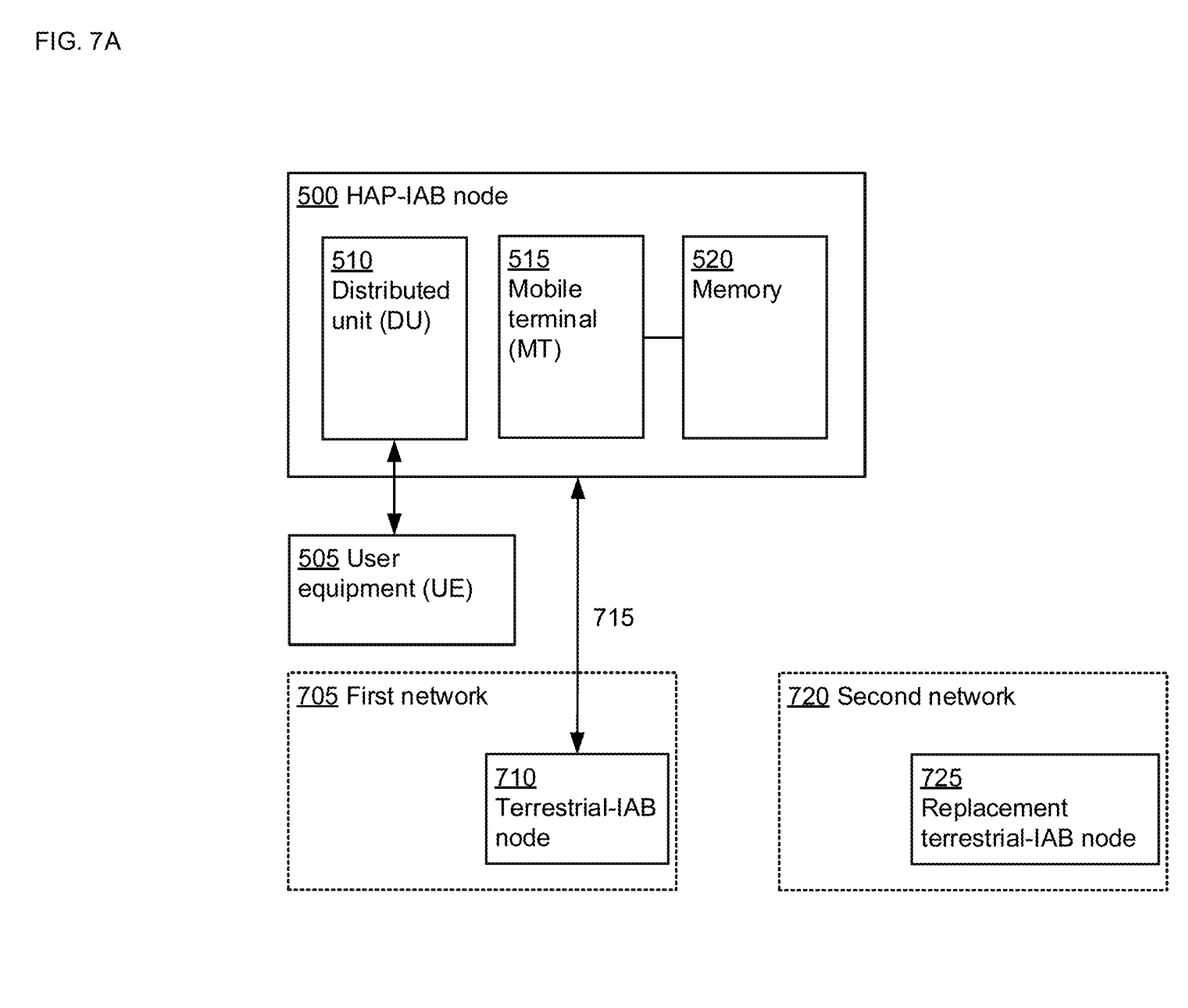
FIG. 7A depicts an example of a terrestrial-IAB node communicating with a HAP-IAB node before an emergency occurs.
Figure 7B:
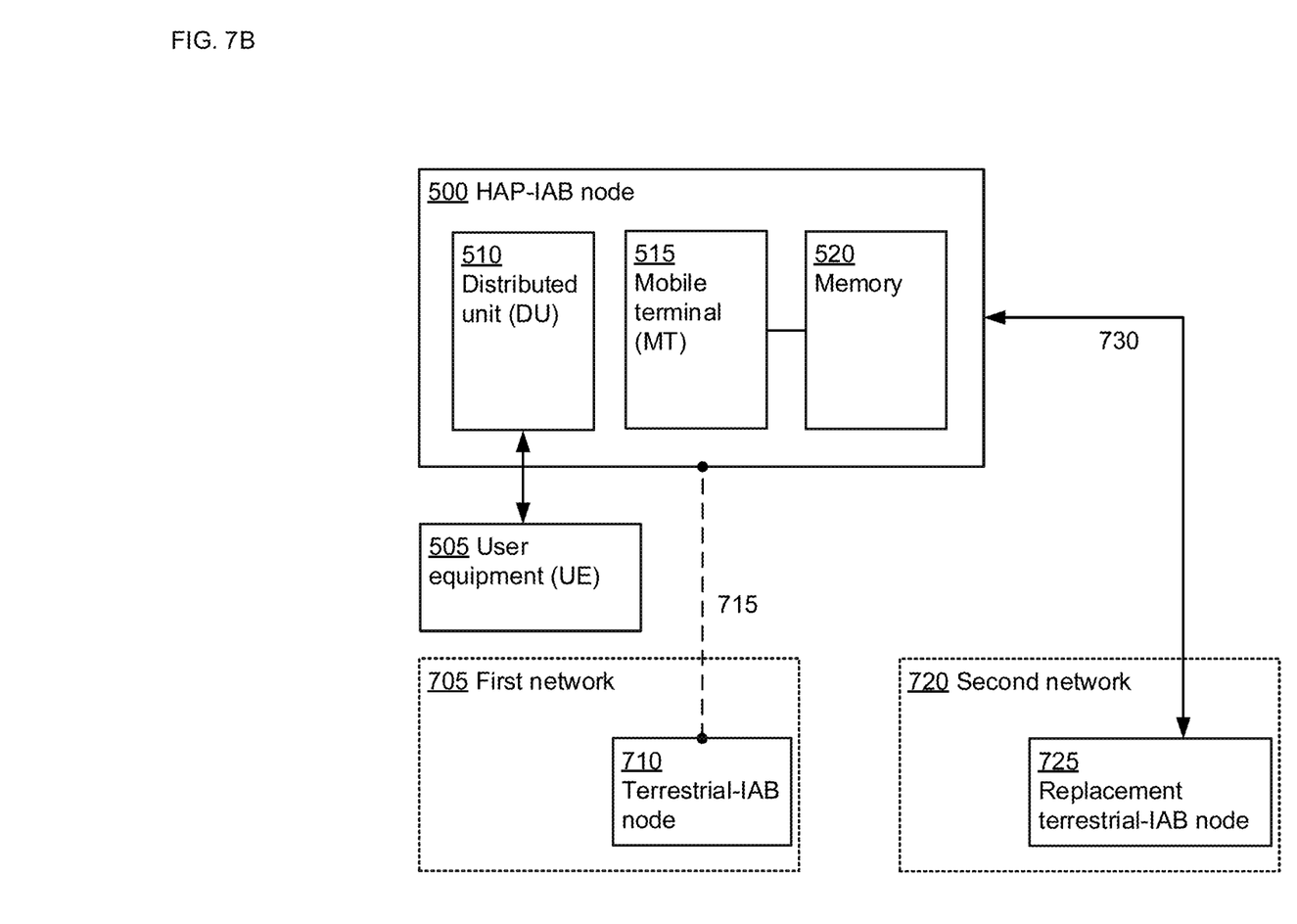
FIG. 7B depicts an example of the terrestrial-IAB node and the HAP-IAB node after the emergency disruption occurs.

FIG. 7A depicts an example of a terrestrial-IAB node 710, which may be configured in the same manner as the gNB 200, communicating with the HAP-IAB node 500 before an emergency occurs. FIG. 7B depicts an example of the terrestrial-IAB node and the HAP-IAB node after the emergency occurs.

As shown in FIG. 7A, the HAP-IAB node 500 communicates with a terrestrial-IAB node 710 in a first network 705 located on the ground via a communications link 715. Therefore, data received at the HAP-IAB node 500 from UE 505 or any other device or node in its coverage area may be transmitted to terrestrial-IAB node 710 via the communications link 715, which serves as an IAB link.

The one or more processors of the HAP-IAB node 500, such as one or more processors 404 shown in FIG. 4, may detect a service disruption of the communications link 715 based on network protocols such as, for example, existing 5G protocols. When service provided by the terrestrial-IAB node 710 and/or the communications link 715 is disrupted, as shown by the dashed line 715 shown in FIG. 7B, UE(s), such as UE 505, are unable to place a call via the HAP-IAB node 500 because no suitable backhaul route exists to carry traffic.

The one or more processors of the HAP-IAB node 500 may then determine that the service disruption of the communications link 715 is due to an emergency in the geographic area of the terrestrial-IAB node 710. For example, the HAP-IAB node 500 may receive a message informing of the service disruption from a source, such as a satellite. In another example, the HAP-IAB 500 may receive an indication from another link on the HAP-IAB node 500 that the communications link 715 was dropped, even though the other link may not have enough capacity to carry the backhaul. In yet another example, the HAP-IAB node 500 may make a determination due to it being unable to raise its primary backhaul and, after an extended period of time, the existence of an emergency situation may be determined. The extended period of time may be on the order of one or more hours.

In accordance with one aspect of the technology, when service provided by the first network 705 and/or the communications link 715 is disrupted, as depicted by FIG. 7B, the MT 515 of the HAP-IAB node 500 may be activated by the one or more processors and may seek a replacement for the terrestrial-IAB node 710 in the first network 705 that is capable of providing emergency IAB backhaul capabilities. The MT 515 may be configured to output a higher signal power than the HAP-IAB node DU 510. For example, the signal power output from the MT 515 may be more than 23 dBm. To output the higher signal power, power limits typically established for access and backhaul links may be exceeded when an emergency occurs that requires one or more new links with a more distant network to be established. The higher signal power may be created by redirecting power typically used for navigation or for an access link to be used for backhauling. Using the higher signal power, the HAP-IAB node 500 may search for and establish a connection 730 with a second terrestrial-IAB node in the first network or a second network different from the first network. For example, a connection 730 may be established between the HAP-IAB node and a replacement terrestrial-IAB node 725 in a second network 720.

The MT 515 may send a system information message to the UE 505 specifying whether the second network supports emergency calls and may indicate if the backhaul is currently disabled. Further, the replacement terrestrial-IAB node 725 discovered by the HAP-IAB MT 500 may send a system information (SI) message to the HAP-IAB node 500 specifying whether the terrestrial-IAB node 725 supports emergency calls or emergency call backhaul. Accordingly, a new backhaul is established between the HAP-IAB node 500 and the replacement terrestrial-IAB node 725 until the emergency situation is resolved and the first network 705 is no longer disabled.

In one aspect, the terrestrial-IAB node 725 in second network 720 may broadcast a signal which indicates that the second network 720 can provide emergency backhaul services or can provide additional services. The HAP-IAB 500 may detect the signal broadcasted from the terrestrial-IAB node 725 and store information in the memory 520 related to establishing a connection 730 with the terrestrial-IAB node 725 based on the signal. The connection 730 may be configured for emergency calls when the signal indicates that the second network 720 can provide emergency backhaul services and may be further configured for additional services when the signal indicates that the second network 720 can provide the additional services.

When the terrestrial-IAB node 725 can provide emergency backhaul services through the second network 720, the HAP-IAB node 500 may transmit or broadcast a signal indicating that it will allow emergency calls on its networks. When only emergency backhaul services are provided by the second network 720, the signal may indicate that the HAP-IAB node 500 will only carry emergency calls and no other calls. In this scenario, the HAP-IAB node 500 may block all calls except for emergency calls.

The HAP-IAB node 500 monitors the geographic area for emergency calls from UE. The UE 505 in the geographic area may send a signal to the HAP-IAB node 500 indicating that it is making an emergency call. For example, the signal may include an emergency number being dialed by the UE 505 or other information identifying that the call being placed by the UE 505 is an emergency call. When the HAP-IAB node 500 receives emergency calls from a number of UEs in the geographic area that exceed a threshold number, the HAP-IAB node 500 may determine that there is an emergency in the geographic area that has caused the service disruption to communications link 715.

After receiving the signal with the indication that the call is an emergency call, the HAP-IAB node 500 may establish an emergency IAB backhaul link to the second network 720 based on the previously stored information in the memory 520. Alternatively, the HAP-IAB node 500 may first establish an emergency backhaul link 730 with the second network 720, and then may transmit or broadcast a signal indicating that emergency calls will be accepted.

In another alternative, the signal indicating that emergency calls will be accepted using the HAP-IAB node 500 using an emergency backhaul link to the second network 720 is sent via another node, such as a satellite. This may be implemented by transmitting, by the MT 515, a special international mobile subscriber identity (IMSI) or other type of identifier which identifies the HAP-IAB node 500 as available for emergency calls to the other node. The special IMSI or other identifier may also indicate the location of the HAP-IAB node 500 and/or other information for establishing a connection with the HAP-IAB node 500 so UEs that receive the signal may be able to efficiently establish a connection with the HAP-IAB node 500. Alternatively, the MT 515 may dial a special emergency number when reaching out to the replacement terrestrial-IAB node 725 indicating that this is an emergency call.

Figure 8:
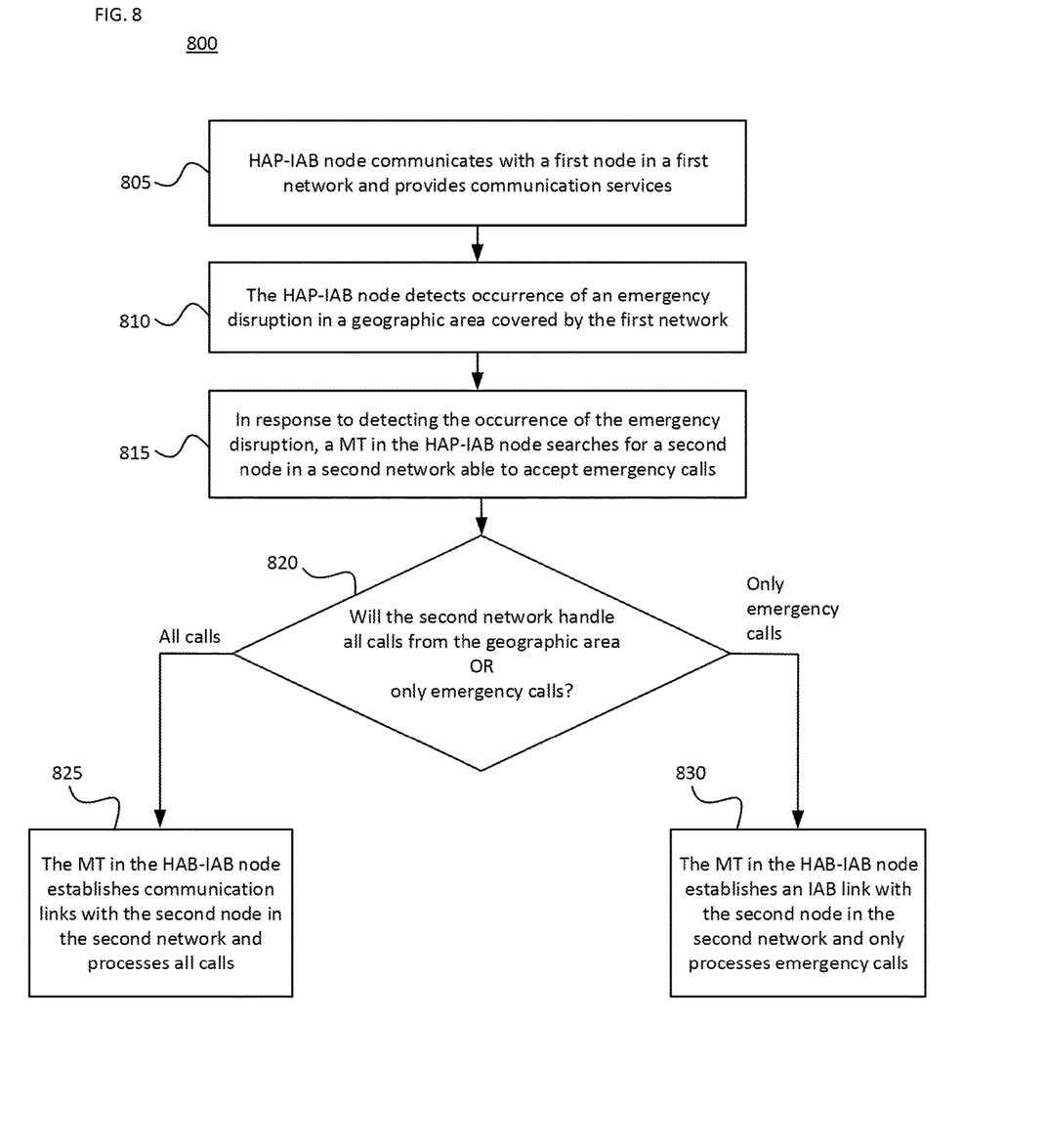
FIG. 8 shows a method for processing calls when an emergency disruption occurs in accordance with one aspect of the technology.

FIG. 8 shows a method 800 comprising a HAP-IAB node communicating with a first node in a first network and providing communication services (step 805), and the HAP-IAB node detecting an occurrence of an emergency service (step 810). The method 800 further comprises in response to detecting the occurrence of the emergency disruption, a HAP-IAB MT in the HAP-IAB node searches for and establishes communication links with a second network including a second node able to accept emergency calls (step 815), and the HAP-IAB node determines whether the second network will handle all calls or only emergency calls (step 820). If the HAP-IAB node determines that the second network will handle all calls, the HAP-IAB establishes links with the second network and processes all calls (step 825). If the HAP-IAB node determines that the second network will only handle emergency calls, the HAP-IAB establishes an IAB backhaul link with the second network and only processes emergency calls (step 830).

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the aspects should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible aspects. Further, the same reference numbers in different drawings can identify the same or similar elements.

The invention claimed is:

1. A method of providing communication service during an emergency, the method comprising:
   providing communication services for handling calls initiated by at least one user equipment (UE), by a high-altitude platform (HAP) node, using a first network;
   detecting, by the HAP node, that an emergency disruption has occurred that prevents the use of the first network by the HAP node;
   in response to detecting the occurrence of the emergency disruption, searching, by a mobile terminal (MT) in the HAP node, for a second network able to accept emergency calls;
   determining, by the HAP node, whether the second network will handle all calls initiated by the at least one UE or only emergency calls generated by the at least one UE; and
   handling, by the HAP node, the calls based on the determining and through the use of the second network.

2. The method of claim 1, wherein the HAP node activates the MT to initiate the searching for the second network when the HAP node detects that the emergency disruption has occurred.

3. The method of claim 1, wherein the second network includes a terrestrial-integrated access backhaul (IAB) node that broadcasts a signal indicating whether the terrestrial-IAB node can handle only emergency calls or all calls.

4. The method of claim 3, further comprising:
   the MT receiving the signal broadcasted by the terrestrial-IAB node; and
   storing information related to establishing a connection with the terrestrial-IAB node based on the signal.

5. The method of claim 1, further comprising establishing at least one link between the HAP node and the second network.

6. The method of claim 5, wherein the at least one link includes an integrated access backhaul (IAB) link.

7. The method of claim 1, wherein the emergency disruption is detected by the HAP node receiving a message from a satellite.

8. A high-altitude platform (HAP) node, comprising:
   a distribution unit (DU) configured to receive a call from at least one user equipment (UE); and
   a mobile terminal (MT);
   wherein the HAP node is configured to:
      provide communication services for handling calls initiated by the at least one UE using a first network,
      detect that an emergency disruption has occurred that prevents the use of the first network by the HAP node, wherein in response to detecting the occurrence of the emergency disruption, the MT is configured to search for a second network able to accept emergency calls,
      determine whether the second network will handle all calls initiated by the at least one UE or only emergency calls generated by the at least one UE, and
      handle the calls based on the determining and through the use of the second network.

9. The HAP node of claim 8, wherein the HAP node is configured to activate the MT to initiate the searching for the second network when the HAP node detects that the emergency disruption has occurred.

10. The HAP node of claim 8, wherein the second network includes a terrestrial-integrated access backhaul (IAB) node that is configured to broadcast a signal indicating whether the terrestrial-IAB node can handle only emergency calls or all calls.

11. The HAP node of claim 10, further comprising a memory, wherein the MT is configured to receive the signal broadcasted by the terrestrial-IAB node and store information related to establishing a connection with the terrestrial-IAB node based on the signal.

12. The HAP node of claim 8, wherein the HAP node is configured to establish at least one link between the HAP node and the second network.

13. The HAP node of claim 12, wherein the at least one link includes an integrated access backhaul (IAB) link.

14. The HAP node of claim 8, wherein the emergency disruption is detected by the HAP node based on receipt of a message from a satellite.

15. A non-transitory computer readable medium on which instructions are stored, the instructions when executed by one or more processors in a high-altitude platform (HAP) node, cause the one or more processors to perform a method for providing communication service during an emergency, the method comprising:
   providing communication services for handling calls initiated by at least one user equipment (UE) using a first network;
   detecting that an emergency disruption has occurred that prevents the use of the first network by the HAP node;
   in response to detecting the occurrence of the emergency disruption, searching for a second network able to accept emergency calls;
   determining whether the second network will handle all calls initiated by the at least one UE or only emergency calls generated by the at least one UE; and
   handling the calls based on the determining and through the use of the second network.

16. The non-transitory computer readable medium of claim 15, wherein the one or more processors in the HAP node are configured to activate a mobile terminal (MT) in the HAP node to initiate the searching for the second network when the HAP node detects that the emergency disruption has occurred.

17. The non-transitory computer readable medium of claim 15, wherein the second network includes a terrestrial-integrated access backhaul (IAB) node that broadcasts a signal indicating whether the terrestrial-IAB node can handle only emergency calls or all calls.

18. The non-transitory computer readable medium of claim 17, the method further comprising:
   receiving the signal broadcasted by the terrestrial-IAB node; and
   storing information related to establishing a connection with the terrestrial-IAB node based on the signal.

19. The non-transitory computer readable medium of claim 15, the method further comprising establishing at least one link between the HAP node and the second network, wherein the at least one link includes an integrated access backhaul (IAB) link.

20. The non-transitory computer readable medium of claim 19, wherein the emergency disruption is detected by the HAP node receiving a message from a satellite.

\* \* \* \* \*